Inventors
John H. Nehrbass
and James D. Walton
By Mann, Brown & McWilliams
Attys.

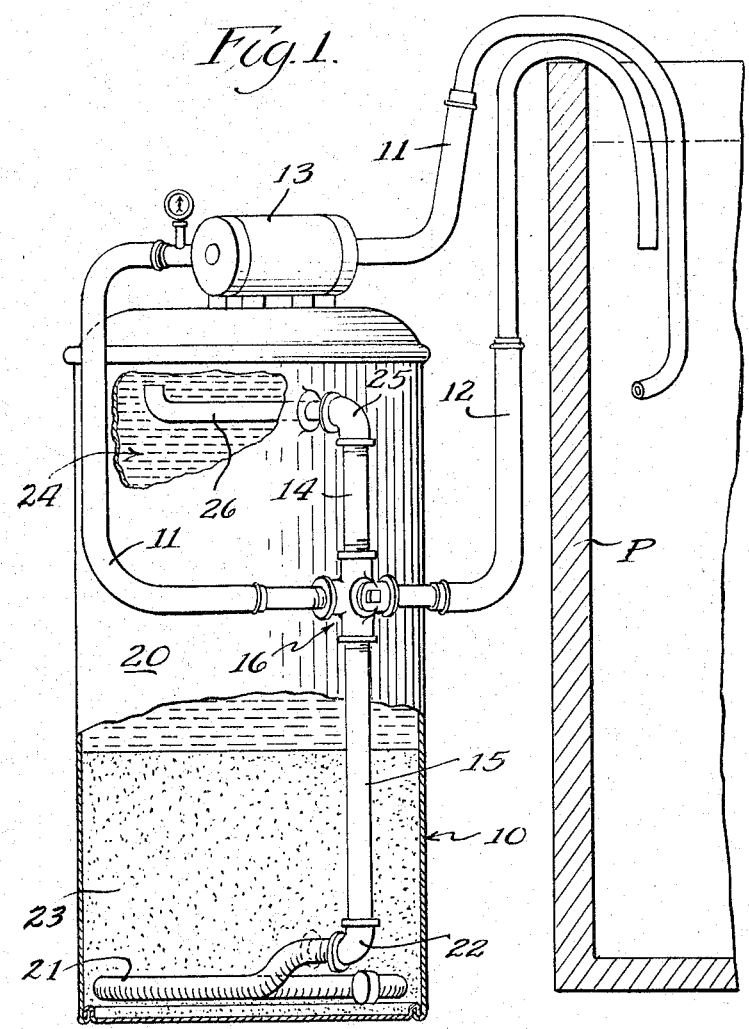
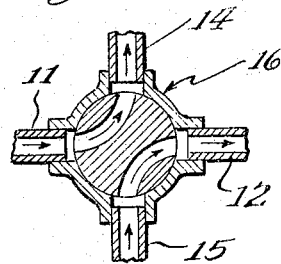
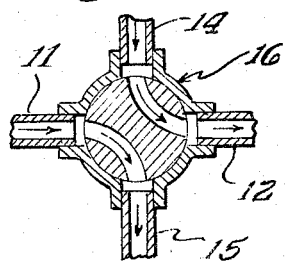
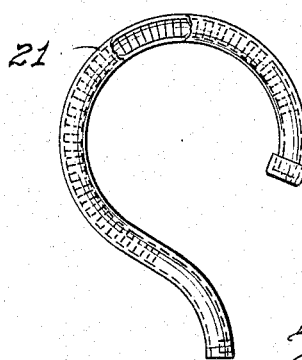

3,276,588
LIQUID FILTER
John H. Nehrbass, Chicago, and James D. Walton, Roselle, Ill., assignors to Hydronics Manufacturing Corporation, a corporation of Illinois
Filed Oct. 21, 1964, Ser. No. 406,665
1 Claim. (Cl. 210—169)

This application is filed as a continuation-in-part of application Serial No. 235,981, filed November 7, 1962, now abandoned.

This invention relates to liquid filters and more particularly is concerned with an improved liquid filter of a type such as is useful with swimming pool installations of all sizes.

At present, two different types of filters are employed for swimming pools, the combination sand and gravel type and the diatomaceous earth type.

The principal disadvantages of the combination sand and gravel type of liquid filter are its large size and weight and its high installation cost. The principal advantages of the sand and gravel type are its low operating cost, its higher flow rate and filtering capacity and its ease of maintenance. Correspondingly, the principal advantages of the diatomaceous earth type of liquid filter are its small size and weight and its low initial cost, while its principal disadvantages are its high operating cost, its relatively short-lived flow rate and filtering capacity and the excessive maintenance requirements.

The principal object of this invention is to provide a liquid filter having all of the advantages of both types of prior art filters without any of the disadvantages. More specifically, the objects of the invention include the provision of a liquid filter having small size and weight, low initial cost, low operating cost, long term high flow rate and filter capacity and ease of installation and maintenance.

Another object of the invention is the provision of a filter tank and pump arrangement having a tank mounted pump and provided with internal aspiration means to prevent internal air pocket development.

Other objects and advantages will become apparent during the course of the following description.

In the accompanying drawings forming a part of this specification and in which like numerals are employed to designate like parts throughout the same:

FIGURE 1 is a generalized elevational view illustrating the arrangement of the improved liquid filter, with parts thereof broken away and shown in section and also illustrating its connection to a swimming pool;

FIGURES 2A and 2B are diagrammatic views illustrating the valving sequence for the filter cycle and back-wash cycle, respectively;

FIGURE 3 is a plan view of the under-drain employed in the filter of FIGURE 1 and illustrating an alternative slot configuration;

Figure 4:
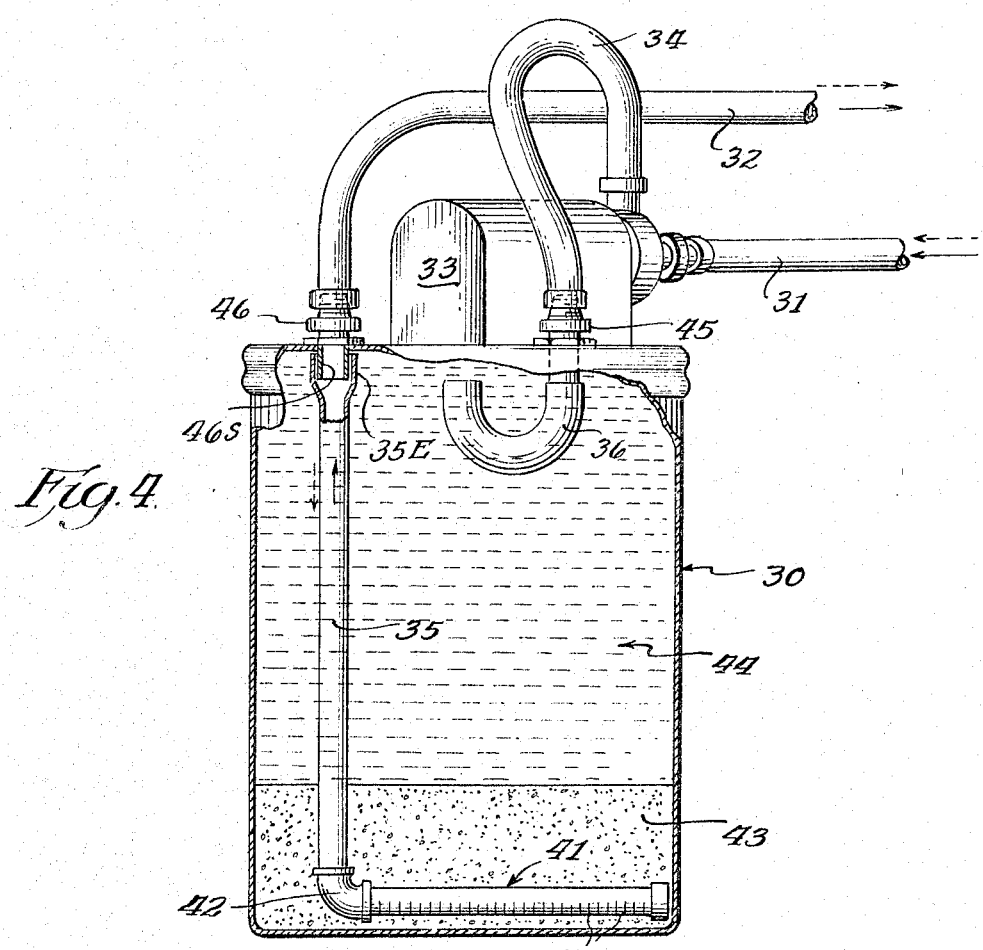
FIGURE 4 is a generalized elevational view of another filter arrangement of modified form, with parts thereof broken away and shown in section.

Referring now to FIGURES 1 to 3 of the drawings, the liquid filter of this invention is designated generally at 10 and is shown with connection lines 11 and 12 communicating with liquid in a pool P for continuously circulating liquid through the filter 10 to remove all particles therefrom of a size of 12 microns or more. The filter is equipped with a pressure type liquid circulation system that includes a motor-pump unit 13, an infeed line 14, a drain line 15, and a two-position, four-way valve 16 interconnecting the lines 11, 12, 14 and 15, with the supply line 11 leading from the pool P and having the motor-pump unit connected therein and with the return line 12 leading back to the pool.

The valve 16 is operable to select either a filter cycle or a back-wash cycle. For the filter cycle, the valve 16 is in the position illustrated in FIGURE 2A and it connects the supply line 11 to deliver dirty liquid from the pool to the infeed line 14 and also connects the drain line 15 to deliver clean liquid from the filter 10, through the return line 12 to the pool. For the back-wash cycle, the valve 16 is in the position in which it is illustrated in FIGURE 2B, wherein it connects the supply line 11 to flow liquid reversely through the drain line 15 and connects the infeed line 14 for accommodating a reverse liquid flow therethrough and then into the return line 12 which is removed from the pool during the back-wash cycle to discharge the back-wash water as waste.

In the arrangement illustrated herein for purposes of illustrative disclosure, the filter unit 10 comprises an enclosed tank 20 having an under-drain 21 disposed within its lower end and connected through a side mounted tank fitting 22 that connects to the drain line 15, a filter bed 23 enveloping the under-drain 21 and a water space 24 above the filter bed 23 and filling the tank during normal operation. The infeed line 14 is connected through a side mounted tank fitting 25 and includes an internal discharge tube 26 that projects cross-wise in the water space and terminates in a full sized opening that is preferably directed upwardly.

In accordance with this invention, the filter bed is comprised principally of solid particles on the order of .0164 inch diameter and the under-drain is provided with openings sized to prevent passage of these particles. To obtain maximum filtering efficiency with a given quantity of filter bed media and hence to enable reduction in the size and weight of the unit it is preferable that substantially all the filter particles be close to the specified size. This size rating may be selected anywhere within a range of from .0029 (U.S. screen #200) to .034 (U.S. screen #20) depending upon the specific requirements of the filtering application and the cost and availability factors of the filter media. In general, the smaller the size of the filter particle, the more effective the filter action. In the preferred practice of the invention, the solid particles comprising a filter media as defined herein may be sand, ground anthracite or materials having equivalent density and filtering properties.

While as suggested above it is preferred that the particles employed all be of a comparable or uniform size, sand or equivalent filter bed material is not conveniently available in bulk quantities except according to prescribed class designations which are defined by the percentage quantities that pass various screens of prescribed U.S. mesh sizes. Therefore, from the available sand materials, it is preferred to employ a number 36 filter sand size (AFS-Grain Fineness #28) or finer for the make-up of the entire filter bed. The size distribution of the No. 36 filter sand is given below in terms of the screen size in accordance with standard practice:

TABLE I.—No. 36 FILTER SAND

| United States Mesh Screen Size | Minimum Particle Retained | Percent By Weight Retained |
| --- | --- | --- |
| 20 | .034 | 1.6 |
| 30 | .025 (approx.) | 32.8 |
| 40 | .0164 | 61.6 |
| 50 | .0116 | 3.8 |
| 70 | .0083 | 0.2 |

As indicated in the table, the 40 mesh screen retains 61.6 percent of the sand in the form of particles in the size range of from .0164 to .025; and 32.8 percent of particles in the size range of from .025 to .034. Thus, the vast bulk of the sand particles lie within a narrow range and for the 36 filter sand may be said to be substantially uniform. It also should be noted that the smallest sized particles, namely those retained on the 70 U.S. mesh screen, are .0083 inch or greater.

To satisfy the needs of a filter for swimming pool applications, it is important that the elevation of the infeed line opening be spaced above the sand a distance sufficient to prevent escape of the sand during the backwash cycle. It has been determined that this distance should be approximately 30 percent of the height of the filter bed. By way of example, if the height of the filter bed 23 is 7 inches, the height of the outlet opening of the discharge tube 26 should be at least 2.1 inches thereabove as the sand particles are capable of rising only about 2 inches during a back-wash cycle on the filter bed arrangement. The simplicity of the filter arrangement disclosed herein is possible because leaves, dirt particles, bugs, hair and any other solid material of this nature will rise higher than the sand particles during the back-wash cycle and thus are enabled to escape through the infeed line. It is important that the infeed line opening be large enough to accommodate movement therethrough of the solid particles listed herein in order to avoid clogging and such large sized opening can be accommodated because of its elevated location with respect to the filter bed.

The under-drain 21, as shown herein for purposes of illustrative disclosure is in the form of a pipe having a curving configuration and provided with a plurality of openings at spaced points therealong. The length of the under-drain determines the number of openings permissible and hence the flow rate capacity. In high flow rate applications, a curved configuration affords maximum capacity within the limits of the cross-section of the tank. It is contemplated that in certain low capacity above-ground swimming pool applications, the under-drain may be a straight pipe extending crosswise in the bottom of the tank. The openings preferably are located on the underface of the pipe and are in the form of elongated slots oriented transversely of the central axis of the pipe. The minimum width dimension for the under-drain slots should be less than the minimum particle dimension employed in the filter bed. Assuming all particles were .0164″ diameter, a minimum slot dimension of about .015″ is suitable. Assuming No. 36 filter sand mix is employed, a maximum width dimension on the order of .006″ to .012″ is suitable for the slots.

In FIGURE 1 the slots are illustrated as being continuous semi-circles cut through the underface of the pipe while in FIGURE 3 the slots are illustrated in an aligned interrupted configuration. Since the invention contemplates use of slots having a maximum width dimension on the order of .006 to .012 inches, the slots must be spaced apart sufficiently to maintain the structural strength of the under-drain pipe and avoid the possibility of flexure of the main length of the pipe creating either or both oversized and undersized openings.

Assuming the under-drain 21 is to be used in a filter having an overall capacity of 30 gallons per minute, a pipe of 1″ O.D. of thin-walled polyvinyl chloride may be employed with 90 semi-circular slots. In this specific example, and assuming a 7″ filter bed of No. 36 filter sand and .010″ minimum slot width on ¼″ spacing, the filter unit can develop a flow rate per surface area capacity of as much as 20 gallons per minute per square foot at a pump pressure of 5 pounds per square inch.

By way of comparison, a combination sand and gravel type filter is limited to a capacity on the order of 5 gallons per minute per square foot in order to prevent sand blow-through. Thus the combination sand and gravel unit must be of substantially greater cross-section and it already requires a much deeper and heavier filter bed structure.

Typical filter sand sizes also contemplated for use, in the practice of this invention, are defined in Tables II to V.

TABLE II.—#2-C FILTER SAND

| United States Mesh Screen Size | | Minimum Particle Retained | Percent By Weight Retained |
|---|---|---|---|
| 30 Mesh | | .025 (approx). | 3 |
| 40 | | .0164 | 58 |
| 50 | | .0116 | 31 |
| 70 | | .0083 | 6 |
| 100 | | .0058 | 2 |
| #1-F | 40 | .0164 | 3 |
| | 50 | .0116 | 35 |
| | 70 | .0083 | 42 |
| | 100 | .0058 | 16 |
| | 140 | .0041 | 4 |
| #50 | 40 | .0164 | Trace |
| | 50 | .0116 | 6 |
| | 70 | .0083 | 38 |
| | 100 | .0058 | 36 |
| | 140 | .0041 | 14 |
| | 200 | .0029 | 4.5 |
| #60 | 50 | .0116 | 2 |
| | 70 | .0083 | 28 |
| | 100 | .0058 | 38 |
| | 140 | .0041 | 24 |
| | 200 | .0029 | 5 |

Figure 5:
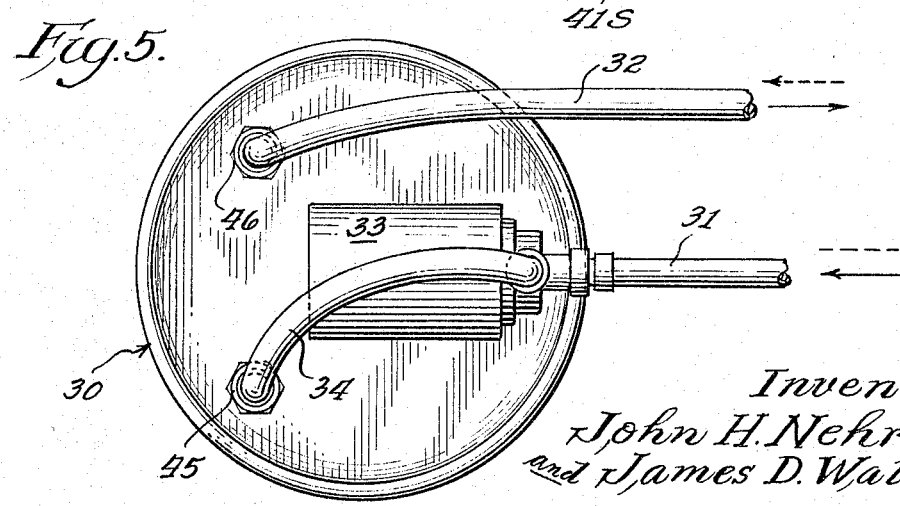
FIGURE 5 is a plan view of the filter arrangement shown in FIGURE 4.

Another embodiment of the filter arrangement of this invention is illustrated in FIGURES 4 and 5 wherein an enclosed tank is designated generally at 30 and is shown with external connection lines 31 and 32 which are associated with the swimming pool for continuously circulating liquid through the arrangement. The filter arrangement again employs a pressure type liquid circulation system that includes a motor pump unit 33 mounted on top of the filter tank, an external infeed line 34, an internal infeed line 36 and an internal drain line 35.

The filter tank 30 is shown equipped with an under-drain 41 disposed within its lower end and connected through an elbow 42 to the internal drain line 35 which extends vertically in the tank to a point immediately adjacent the top of the tank. A loosely packed solid particle filter bed is represented at 43 as enveloping the under-drain 41 and a normally full water space 44 is maintained above the filter bed 43. The connection line 31 leads to the suction side of the pump while the external infeed line 34 leads from the pressure side of the pump and normally connects through a top mounted quick disconnect fitting 45 to the internal infeed line 36. Connection line 32 normally connects through a top mounted quick disconnect fitting 46 to draw liquid from the internal drain line 35. For the filter cycle, the flow directions are indicated by solid line arrows, while for the back-wash cycle, the connection lines 32 and 34 are readily interchanged at the tank and the flow is in the direction indicated by the dotted line arrows in FIGURE 4.

While the previously mentioned sand type filter beds originally permitted major reductions in size and weight of swimming pool filters, the weight may be further reduced by employing aluminum oxide particles having a diameter on the order of .030 inch for the filter bed, though commercially available filter media of this general size category usually include some particles of greater size and some of slightly smaller size. The sizing principle of this invention is again emphasized in relation to the aluminum oxide particles in that it is preferred that substantially all of the filter particles be less than .034 inch in size.

The under-drain 41 is again preferably a closed end section of thin-walled polyvinyl chloride tubing and it is shown substantially to scale within the tank 30 which is 11¼ inches in diameter and 16½ inches deep. The tubing is of 1 inch diameter and about 8 inches in length and since it is straight, it may be provided with slots 41S having a width of .010 inch and spaced at 1/8 inch edge-to-edge intervals, the total number of slots being about 60. The filter bed height preferably is within a range of about 4 inches minimum and 7 inches maximum and, therefore, the opening from the internal infeed line 36 is spaced well above the 30% filter bed height clearance that is desired. This arrangement for the filter can be employed with a pump to achieve a flow rate of 20 gallons per minute per square foot at a pump pressure of about 5 lbs. p.s.i.

An important feature of the invention resides in the provision of an aspirating connection at the top of the internal drain line 35. The connection is in the form of loose fitting overlapping tube ends and preferably is provided by an expanded or flared upper end 35E on the internal drain tube 35 and a dependent connection stub 46S associated with the fitting and disposed in annularly loose fit relation within the flared end 35E to create an annular passage immediately adjacent the top of the tank 30. Normal upward flow through the drain lines 35 and 32 produces an aspirating effect through this passage to draw off any air present within the top of the tank. During the normal filter cycle, entrapped air bubbles tend to build up an air pocket within the top of the tank 30 and at shut-off, air tends to purge through the line 36 to the pump as this is the path of least resistance. This purging through the pump can cause it to lose prime and the presence of the air pocket is generally objectionable and undesired.

With the aspirating arrangement shown herein, the air pocket can never reach the pump as the air is drawn off at the substantially higher effective height of the aspirator connection.

Thus, while preferred constructional features of the invention are embodied in the structure illustrated herein, it is to be understood that changes and variations may be made by those skilled in the art without departing from the spirit and scope of the appended claim.

What is claimed is:

A small and compact flow-through filter for removal of solids from swimming pool liquids and comprising an enclosed upstanding filter tank, and under-drain within the bottom of the said tank and consisting of closed elongated substantially horizontally extending thin-walled tubing having elongated slots oriented transversely therein, a loose particle filter bed directly surrounding and overlying the tubing and comprised of loose packed solid particles of filter media, substantially all of which are somewhat less than .034 inch in size, with each of said slots having a maximum width dimension slightly less than the size range of the bulk of said particles, an internal drain line connected to said under-drain and leading vertically to the top of the tank, an external drain line disposed in at least the extreme upper end of said internal drain line and leading from the top of the tank for discharge into a reservoir of liquid, the cross-sectional area of at least that portion of said external drain line disposed in the extreme upper end of said internal drain being less than that of said extreme upper end to form a space between said extreme upper end of said internal drain line and said portion of said external drain line whereby an aspirating flow-through connection within the extreme upper region of the tank is achieved to prevent build-up of an air pocket within said tank, an infeed line for drawing liquid from the reservoir and leading into said tank to terminate in a discharge opening located beneath the aspirating connection and spaced above said filter to a distance at least 30% of the height of the filter bed, and a pump connected in series with said infeed line and operable to circulate liquid under pressure from the reservoir, through said inlet line to maintain a pressurized liquid space in said tank above said filter bed and encourage downflow of liquid through said filter bed and said under-drain and then through said drain line back to the reservoir, said tubing having a length, slot width and slot spacing to afford a total flow-through capacity in the presence of a 7 inch high filter bed to enable a water flow rate capacity of at least 10 gallons per minute per square foot at a pump pressure of 5 pounds per square inch.

References Cited by the Examiner
UNITED STATES PATENTS

| | | | |
|---|---|---|---|
| 2,789,695 | 4/1957 | Winkler et al. | 210—279 X |
| 2,790,461 | 4/1957 | Lightfoot et al. | 210—169 X |
| 2,956,682 | 10/1960 | Stephan | 210—279 X |
| 3,003,636 | 10/1961 | Schrader | 210—279 X |
| 3,009,577 | 11/1961 | Gugeler | 210—291 X |
| 3,011,643 | 12/1961 | McCoy | 210—169 |

REUBEN FRIEDMAN, *Primary Examiner.*

SAMIH N. ZAHARNA, *Examiner.*